Oct. 6, 1931.  H. ROOT  1,826,481
KITE STRING REEL
Filed May 15, 1929
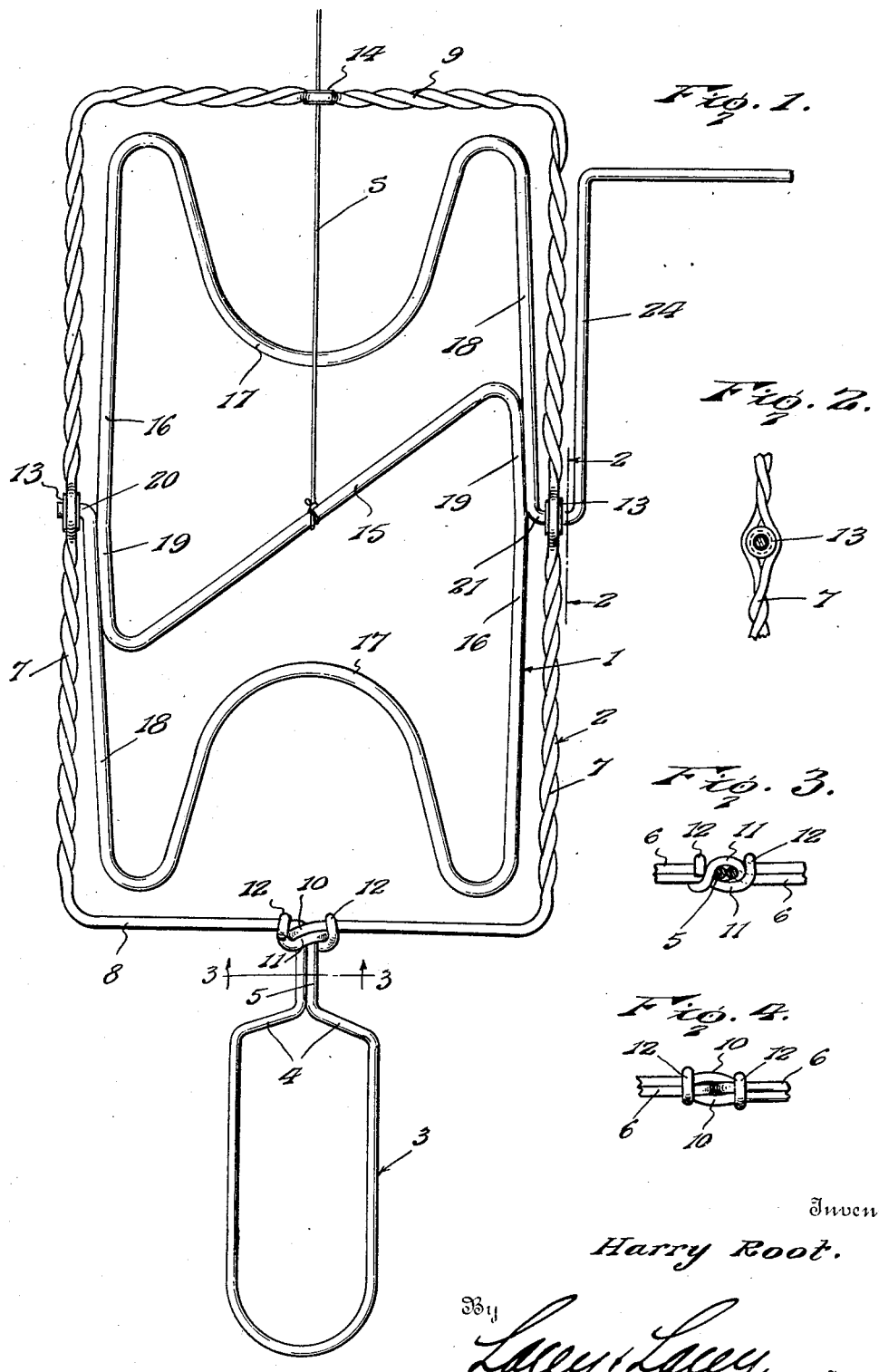
Inventor
Harry Root.
By Lacey & Lacey,
Attorneys Patented Oct. 6, 1931

1,826,481

UNITED STATES PATENT OFFICE

HARRY ROOT, OF BUFFALO, NEW YORK

KITE STRING REEL

Application filed May 15, 1929. Serial No. 363,325.

This invention relates to a reel and more particularly to a reel adapted to be held in a person's hand and upon which the string of a kite may be wound.

One object of the invention is to provide a kite string reel which may be formed from wire strands and will be light in weight but, at the same time, very strong and durable.

Another object of the invention is to provide a reel including a spool carrying frame having a handle by which it may be easily held and to so form the frame and handle that a very strong joint will be formed at the junction of the frame and handle.

Another object of the invention is to so form the sides and outer end portions of the frame that eyes may be set therein to constitute bearings for a spool upon which cord or string is to be wound and also provide a guide for the string at the outer end of the frame.

Another object of the invention is to provide the reel with a spool rotatably mounted in the frame and formed from a strand of wire bent to define a flat spool.

Another object of the invention is to so bend the strand from which the spool is formed that it will be of a strong construction and firmly braced and, in addition, provided with pintles to rotatably mount it in its frame, one of which is extended and bent to form a turning handle for the spool.

The invention is illustrated in the accompanying drawings, wherein:

Figure 1 is a view showing the improved kite string reel in front elevation.

Figure 2 is a fragmentary sectional view taken on the line 2—2 of Figure 1.

Figure 3 is a sectional view through the shank of the handle, taken on the line 3—3 of Figure 1.

Figure 4 is a top plan view of the joint between the handle and frame of the reel.

The improved kite string reel constituting the subject matter of this invention includes a flat spool 1 rotatably mounted in the frame 2 having at its inner end a handle 3 by means of which the frame may be held when the reel is in use. The frame and its handle are formed from a strand of thick wire and in order to form the handle the strand is bent intermediate its ends and then bent inwardly and upwardly. By bending the wire as set forth above, a handle will be formed which is substantially U-shaped in form, as shown in Figure 1, and has its arms extending toward each other at their upper ends, as shown at 4, and then upwardly to provide a shank 5. After forming the shank, the end portions of the wire are bent away from each other, as shown at 6 in Figures 3 and 4, and these end portions then bent to extend upwardly at the sides of the frame.

After extending upwardly the desired distance to form a frame of the proper length, the end portions of the strand are bent toward each other so that they pass in crossed relation to each other and are then bent downwardly and have their lower ends bent inwardly. This provides a frame which is rectangular in shape and has side bars 7 joined by inner and outer end bars 8 and 9 and it will be readily seen that the side bars and inner and outer bars each consists of a pair of strands in close contacting engagement with each other. The ends of the strands from which the frame is formed extend across the shank 5 at opposite sides thereof, as shown at 10, and each end is then bent back upon itself about the shank, as shown at 11, and then twisted about the inner end bar of the frame close to the shank as shown at 12. By this arrangement, the two strands of the inner end bar and the shank will be firmly bound and a very strong joint formed. After the outline of the frame has been formed, eyes 13 and 14, which are provided with marginal grooves, are disposed between the strands of the side bars and outer end bar intermediate their ends and these side and end bars rotated until they are twisted as shown in Figure 1, and the eyes firmly held in place, as shown in Figure 2. If so desired, the side and outer end bars may be each gripped intermediate its length and twisted, after which the eyes may be set in place between the untwisted intermediate portions of the strands forming these bars and pressure applied to the strands at opposite sides of the eyes to firmly secure the eyes. The eye 14 constitutes a guide through which a kite string S is passed and the eyes 13 constitute bearings to rotatably mount the spool 1.

The spool is also formed from a strand of strong wire and this strand is bent to form a cross bar 15 having arms 16 extending from its ends in opposite directions. After forming the arms 16, the end portions of the strands are bent to define inwardly extending U-shaped end bars 17 for the spool, which terminate in spaced relation to the cross bar 15, after which the end portions of the strand are bent to provide arms 18 which overlap the inner ends of the arms 15 to which they are brazed, soldered, or otherwise firmly secured, and together with the arms 16, form side bars 19 for the spool. After forming the arms 18, the strand is bent to provide pintles or stub shafts 20 and 21 which extend from opposite sides of the spool. These pintles pass through the eyes or bearings 13 in order to rotatably mount the spool within the frame and the pintle 21 is extended outwardly from the frame and is bent to form a crank handle 24 by means of which the spool may be rotated in order to allow a kite string to unwind or reel the line in, according to the direction in which the spool rotates.

When the reel is in use, the string or cord of a kite is passed through the eye 14 and tied to the cross bar 15. Therefore, this cross bar serves as an anchor for the string and, in addition, it serves to brace the spool. By turning the spool through the medium of its crank handle, the string can be wound upon the spool, or by releasing the handle, the string can be allowed to unwind. In view of the fact that the side bars and outer end bar of the frame are twisted, they will be very strong and not liable to bend.

What is claimed is:

1. A reel comprising a frame, a handle for said frame, bearings at opposite sides of said frame and a spool in said frame consisting of a strand bent intermediate its length to form a diagonal cross bar for the spool and side bar sections extending in opposite directions from the ends thereof, the strand being then bent to form inwardly bowed end bars for the spool joined to the side bar sections and other side bar sections extending from the end bars and joined to the first side bar sections in overlapped relation thereto to form therewith side bars for the spool, the ends of the strand being bent to form pintles extending in opposed relation to each other from opposite sides of the spool through the bearings of said frame to rotatably mount the spool in the frame, and one pintle being extended and bent to form a turning handle.

2. A reel comprising a frame having a handle and consisting of a strand having its intermediate portion bent to form the handle and the end portions of the strand extending in opposite directions from the handle and bent to form the frame, the end portions of the strand passing each other at the outer end of the frame and retracing each other to the handle and having their ends wrapped about the upper end of the handle from opposite directions and about the inner portions of the frame at opposite sides of the handle, bearings at opposite sides of the frame, and a spool in said frame having pintles journaled in said bearings, one pintle being extended and provided with turning means.

3. A reel comprising a frame having a handle and consisting of a strand having its intermediate portion bent to form the handle having a shank at its upper end and the end portions of the strand extending from opposite sides of the shank and bent to form the frame, the said frame having side and end portions and the frame forming portions of the strand extending past each other intermediate the width of the outer end of the frame and following each other in intertwisted relation thereto back to the shank and having their ends wrapped about the shank in opposite directions and terminating in hooked ends engaged about adjacent portions of the inner end of the frame to form a firm joint between the frame and handle, bearings at opposite sides of the frame, and a spool in said frame having pintles at its sides journaled in said bearings to rotatably mount the spool, one pintle being extended beyond the frame and bent to form a handle.

In testimony whereof I affix my signature.

HARRY ROOT. [L. S.]